(No Model.)
G. P. HARRISON.
ROTARY ASH SIFTER.
No. 516,971. Patented Mar. 20, 1894.
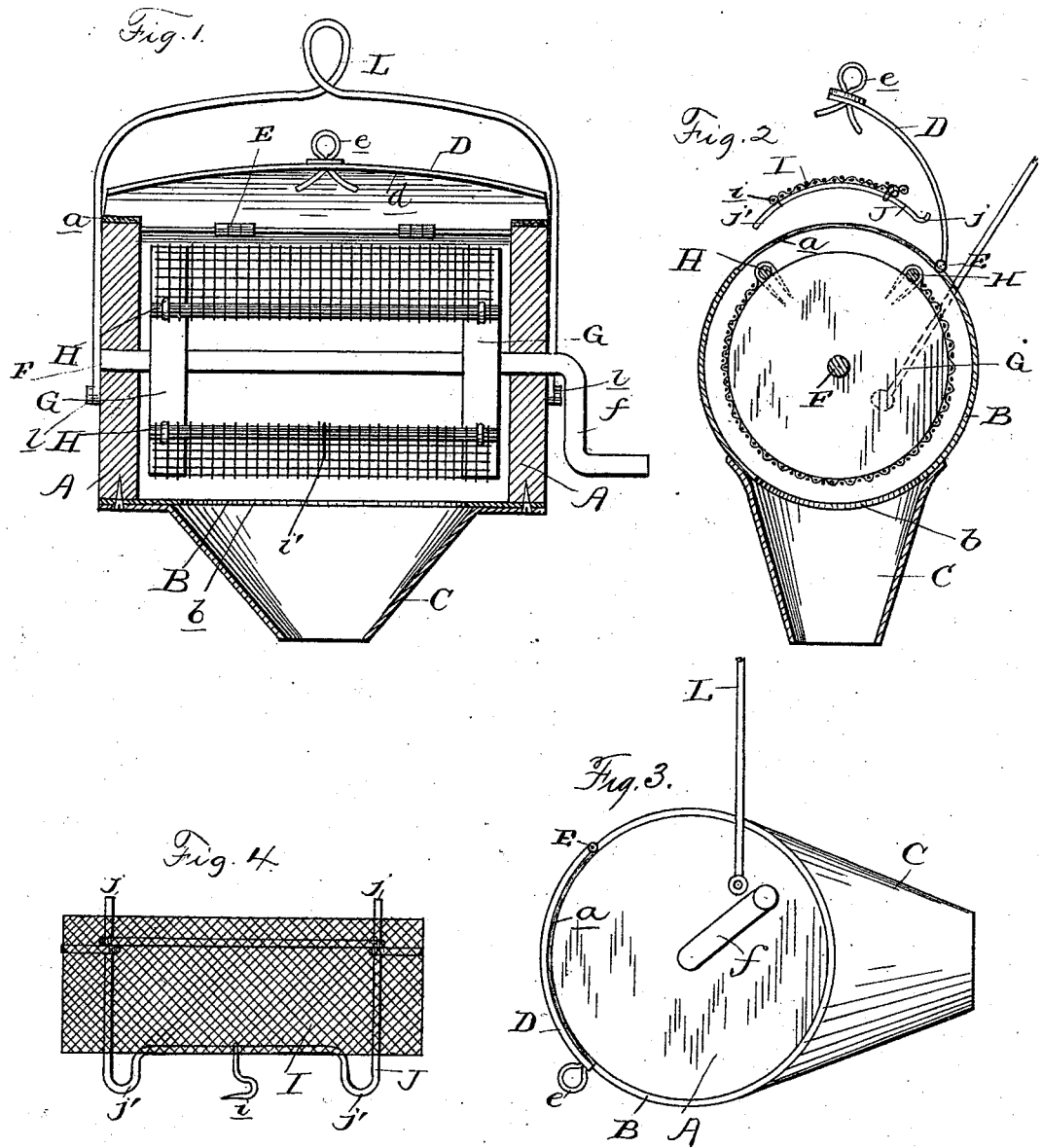
Witnesses
Thos. E. Robertson
W. E. McDaniel
Inventor
George P. Harrison
By T. J. W. Robertson
Attorney
THE NATIONAL LITHOGRAPHING COMPANY,
WASHINGTON, D. C.

UNITED STATES PATENT OFFICE.

GEORGE PRENTICE HARRISON, OF WINDSOR, CANADA.

ROTARY ASH-SIFTER.

SPECIFICATION forming part of Letters Patent No. 516,971, dated March 20, 1894.

Application filed May 5, 1893. Serial No. 473,055. (No model.)

*To all whom it may concern:*

Be it known that I, GEORGE PRENTICE HARRISON, a subject of the Queen of Great Britain, residing at Windsor, in the county of Essex, Province of Ontario, Canada, have invented certain new and useful Improvements in Rotary Ash-Sifters, of which the following is a specification, reference being had therein to the accompanying drawings.

This invention relates to an improvement in rotary ash-sifters, and has for its objects, first, to provide a sifter so made that it can be placed in an ordinary coal-scuttle, and, second, to so construct it that one can carry the sifter from place to place without spilling its contents; and the invention consists in the peculiar construction, arrangement and combinations of parts hereinafter more particularly described and then definitely claimed.

In the accompanying drawings, which illustrate the preferable way of carrying out my invention—Figure 1 is a vertical central longitudinal section of the casing of my sifter showing the rotary sieve and door in full lines, and with the latter partly open. Fig. 2 is a section taken at right angles to that shown in Fig. 1, and with the door open, and the cover of the sieve detached, ready to fill said sieve. Fig. 3 is a view of the sifter showing it as it would be when carried from place to place. Fig. 4 is a detail view of the door or cover of the sieve.

Referring now to the details of the drawings by letter, A A represent end-pieces around which is placed the outer casing or cylinder B having an opening $b$ in the bottom for the exit of ashes, &c. Around this opening is fastened by rivets or otherwise a funnel C which is adapted to be placed into the ordinary coal hod or scuttle.

The outside casing B does not extend entirely around the ends A A, but leaves an opening at the top, adapted to be closed by the door D. This door D is hinged at E and is locked by the catch $e$ when said catch is turned so that one of its locking arms comes under the end of the outer casing. To make the casing dust-proof, I place a packing of felt or cloth $a$ over the ends A A where the door comes in contact with the ends, and also make the edge $d$ of the door curved, as shown in Fig. 1, so that when the door is locked by the catch $e$, the felt packing will prevent the ashes escaping from the ends and the sides of the door will fit so tight, owing to the curved side being forced straight against the outer casing by the catch $e$, that it will be impossible for the ashes to escape.

In the center of the ends A A is journaled the axle F, which is formed with a crank $f$ on its end, as shown in Fig. 1. On this axle or spindle F are rigidly fastened ends G and the wire netting or sifting material is fastened to the said ends. G in the following manner: Two rods H of stiff wire are securely fastened to the end pieces, as shown in Fig. 1, and the wire is connected to these rods and stretched about five-sixths the way around the ends (the remaining sixth being left for an entrance place for the ashes) and secured to said ends, at proper distances, by nails or tacks. The opening in this screen is filled by the detachable door or cover I, which, as shown best in Fig. 2, is made of a wire frame J and covered with wire netting. This cover is secured to the sieve by the end pieces $j$ of the frame J fitting under one of the rods H, while the other ends $j'$ fit over the other rod H, and the cover is locked to the sieve by a hook $i$ entering an eye $i'$ secured to said sieve.

For convenience in carrying the sifter from one place to another, a handle L is provided which is pivoted to the ends A A at $l$. This handle, it will be noticed, is pivoted to the end-pieces in such a place that when the sifter is carried by the handle said sifter will be in a substantially horizontal position, so that it will be impossible for the ashes to be spilled from the funnel C.

The operation of my device is as follows: The operator places the sifter upon a scuttle, and opens the door D and removes the cover I. The ashes and cinders are then placed in the sieve; the cover I replaced thereon; and the door D securely fastened. The crank $f$ is then turned until all the ashes are sifted, when the operator lifts the sifter by the handle L when the sifter will turn on the pivots $l$ and prevent any dust or ashes that may be in the casing from spilling, and then places the sifter on another scuttle. The door is now again opened, the cover I entirely removed, and the door again fastened. The crank is now again turned and the cinders will escape through the sieve and out of the funnel as the cover of the sifter has been removed.

From the above description and the accompanying drawings it will be seen that I have produced a rotary ash-sifter that can be cheaply made, that is easily operated, and one that with careful treatment cannot get out of order.

What I claim as new is—

In an ash sifter, the combination of the cylindrical screen, the correspondingly shaped inclosing-casing, formed with the door D and spout C, and the bail L, pivoted to each end of said casing on a line intermediate of the spout so as to allow said spout to project laterally and avoid loss of contents while the operator is carrying the screen, substantially as described.

GEORGE PRENTICE HARRISON.

Witnesses:
FREDERIC SUTHERLAND,
GERTIE YOUNGHUSBAND.